United States Patent [19]

Simmons

[11] Patent Number: 5,738,040
[45] Date of Patent: Apr. 14, 1998

[54] VENTILATED CAT LITTER BOX

[76] Inventor: Joseph M. Simmons, 10769 Valor Pl., Santee, Calif. 92071

[21] Appl. No.: 730,905

[22] Filed: Oct. 18, 1996

[51] Int. Cl.⁶ ............................................. A01K 29/00
[52] U.S. Cl. ........................... 119/165; 119/500; 119/163
[58] Field of Search ............................ 119/163, 165, 119/484, 496, 497, 500, 706

[56] References Cited

U.S. PATENT DOCUMENTS

| | | | |
|---|---|---|---|
| D. 335,002 | 4/1993 | Read et al. | D30/161 |
| 3,618,568 | 11/1971 | Breeden | 119/165 |
| 4,347,807 | 9/1982 | Reich | 119/706 |
| 4,522,150 | 6/1985 | Gershman | 119/165 |
| 5,092,270 | 3/1992 | Simons et al. | 119/165 |
| 5,092,277 | 3/1992 | Baillie et al. | 119/165 |
| 5,148,768 | 9/1992 | Hinton | 119/500 |
| 5,165,366 | 11/1992 | Harvey | 119/165 |
| 5,184,568 | 2/1993 | Healey | 119/165 |
| 5,195,457 | 3/1993 | Namanny | 119/165 |
| 5,307,761 | 5/1994 | Berger, III et al. | 119/165 |
| 5,320,065 | 6/1994 | Leopold | 119/706 |
| 5,511,513 | 4/1996 | Baron et al. | 119/163 |
| 5,566,640 | 10/1996 | Krumrei | 119/165 |

*Primary Examiner*—Edgar S. Burr
*Assistant Examiner*—Leslie Grohusky

[57] ABSTRACT

A ventilated cat litter box including a housing having an opening through a front wall thereof. The housing has an open doorway. A pull out drawer is slidably disposed within the opening in the front wall of the housing. The pull out drawer is used to accommodate a litter box. An exhaust fan is secured within a top wall of the housing. The exhaust fan directs air outwardly of the housing. The exhaust fan has a hose extending outwardly therefrom. The hose is coupled to an outlet of a house to dispel unpleasant odors associated with the litter box out of the house.

7 Claims, 3 Drawing Sheets

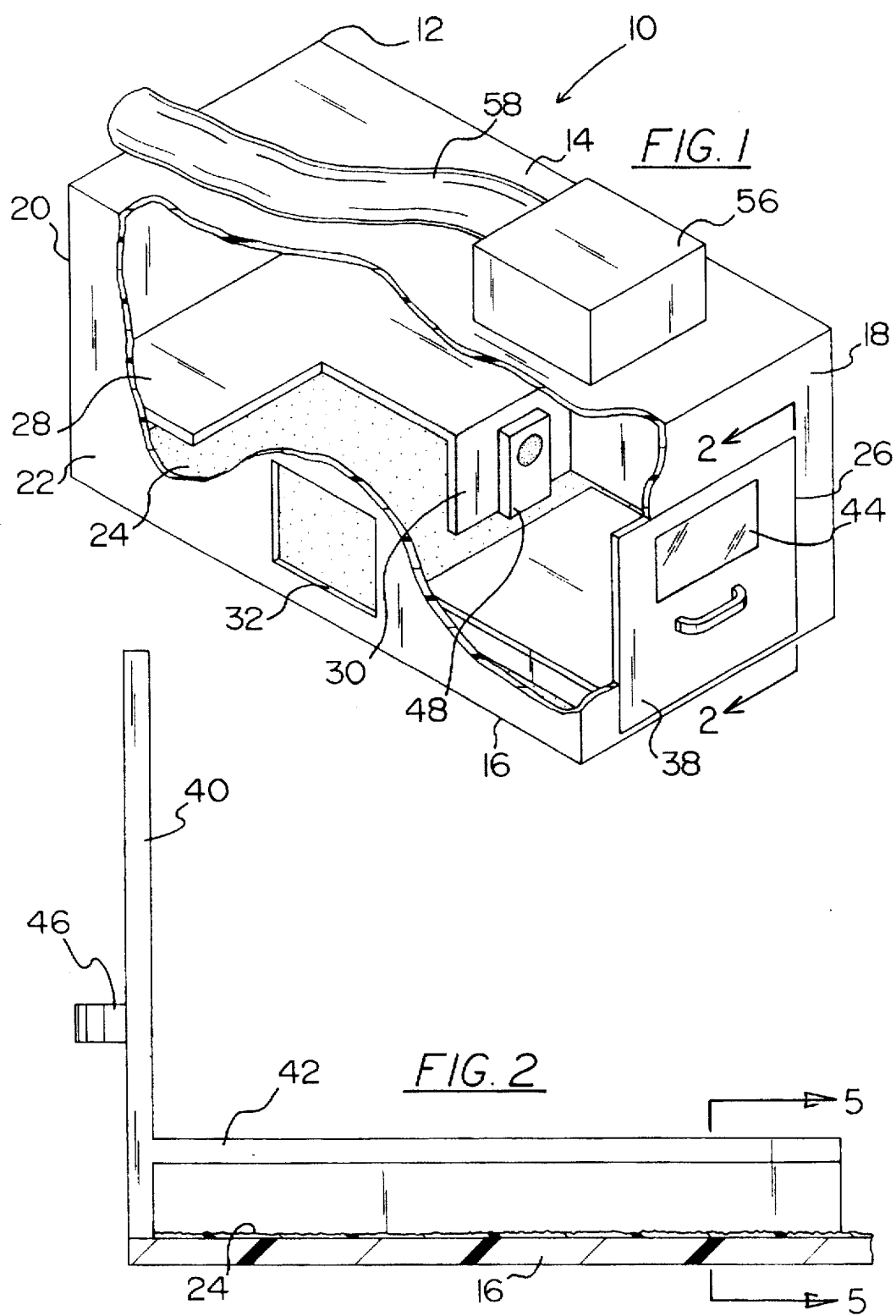

VENTILATED CAT LITTER BOX

BACKGROUND OF THE INVENTION

1. Field of the Invention

The present invention relates to a ventilated cat litter box and more particularly pertains to eliminating unwanted cat litter box odors from within a home with a ventilated cat litter box.

2. Description of the Prior Art

The use of cat litter boxes is known in the prior art. More specifically, cat litter boxes heretofore devised and utilized for the purpose of containing cat litter odors are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,044,325 to Miksitz discloses a ventilated litter box.

U.S. Pat. No. 5,361,725 to Baillie et al. discloses a litter containment apparatus for kittens and cats.

U.S. Pat. No. 5,315,964 to Mimms et al. discloses a portable cat litter box with electrically powered ventilation.

U.S. Pat. No. Des. 361,647 to Thomas et al. discloses the ornamental design for a cat house.

U.S. Pat. No. 4,095,559 to Griffith discloses a ventilated litter box.

U.S. Pat. No. 5,092,277 to Baillie et al. discloses a cat litter containment system.

While these devices fulfill their respective, particular objective and requirements, the aforementioned patents do not describe a ventilated cat litter box for eliminating unwanted cat litter box odors from within a home.

In this respect, the ventilated cat litter box according to the present invention substantially departs from the conventional concepts and designs of the prior art, and in doing so provides an apparatus primarily developed for the purpose of eliminating unwanted cat litter box odors from within a home.

Therefore, it can be appreciated that there exists a continuing need for new and improved ventilated cat litter box which can be used for eliminating unwanted cat litter box odors from within a home. In this regard, the present invention substantially fulfills this need.

SUMMARY OF THE INVENTION

In the view of the foregoing disadvantages inherent in the known types of cat litter boxes now present in the prior art, the present invention provides an improved ventilated cat litter box. As such, the general purpose of the present invention, which will be described subsequently in greater detail, is to provide a new and improved ventilated cat litter box and method which has all the advantages of the prior art and none of the disadvantages.

To attain this, the present invention essentially comprises a housing having a generally rectangular configuration. The housing has a top wall, a bottom wall, a front wall, a back wall and two opposed side walls. An interior surface of the bottom wall has a layer of synthetic carpeting disposed thereon. The front wall has an opening therethrough. The housing has an L-shaped shelf secured therein extending between the back wall and one of the two opposed side walls. The L-shaped shelf has a front portion extending downwardly from a front edge thereof. One of the opposed side walls has an open doorway therethrough. A circular window extends through the opposed side wall opposite the open doorway. A pull out drawer is slidably disposed within the opening in the front wall of the housing. The pull out drawer includes a front panel and an interior panel. The interior panel extends inwardly of the housing from a lower edge of the front panel in an orthogonal relationship. The front panel has a window therethrough and a handle disposed below the window. A deodorizer is secured to the front portion of the L-shaped shelf within the housing. A motion detector is secured to the opposed side wall of the housing opposite the open doorway. An exhaust fan is secured within the top wall of the housing. The exhaust fan directs air outwardly of the housing. The exhaust fan is in electrical communication with the motion detector. The exhaust fan has a hose extending outwardly therefrom.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ventilated cat litter box which has all the advantages of the prior art cat litter boxes and none of the disadvantages.

It is another object of the present invention to provide a new and improved ventilated cat litter box which may be easily and efficiently manufactured and marketed.

It is a further object of the present invention to provide a new and improved ventilated cat litter box which is of durable and reliable construction.

An even further object of the present invention is to provide a new and improved ventilated cat litter box which is susceptible of a low cost of manufacture with regard to both materials and labor, and which accordingly is then susceptible of low prices of sale to the consuming public, thereby making such a ventilated cat litter box economically available to the buying public.

Even still another object of the present invention is to provide a new and improved ventilated cat litter box for eliminating unwanted cat litter box odors from within a home.

Lastly, it is an object of the present invention to provide a new and improved ventilated cat litter box including a housing having an opening through a front wall thereof. The housing has an open doorway. A pull out drawer is slidably disposed within the opening in the front wall of the housing. The pull out drawer is used to accommodate a litter box. An exhaust fan is secured within a top wall of the housing. The exhaust fan directs air outwardly of the housing. The exhaust fan has a hose extending outwardly therefrom. The hose is coupled to an outlet of a house to dispel unpleasant odors associated with the litter box out of the house.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the ventilated cat litter box constructed in accordance with the principles of the present invention.

FIG. 2 is a cross-sectional view as taken along line 2—2 of FIG. 1.

The same reference numerals refer to the same parts through the various Figures.

DESCRIPTION OF THE PREFERRED EMBODIMENT

Figure 3:
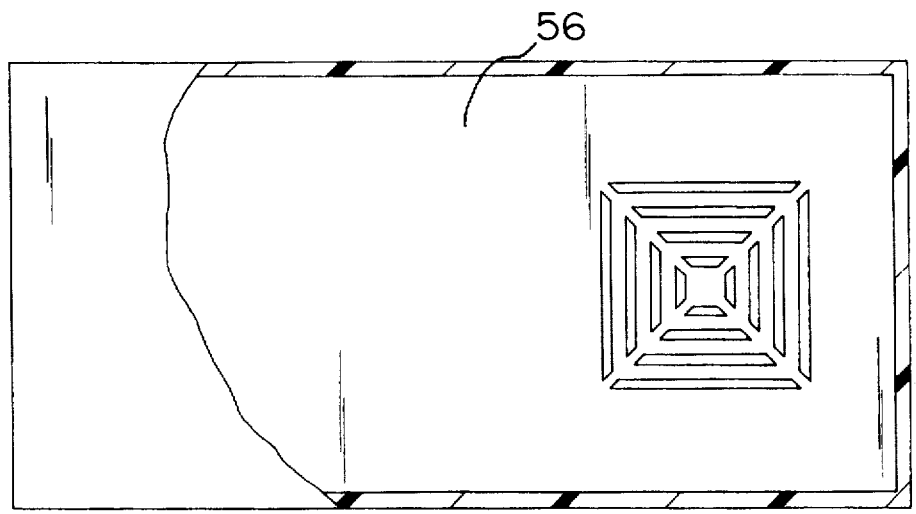
FIG. 3 is a side view of the exhaust fan of the present invention.
Figure 4:
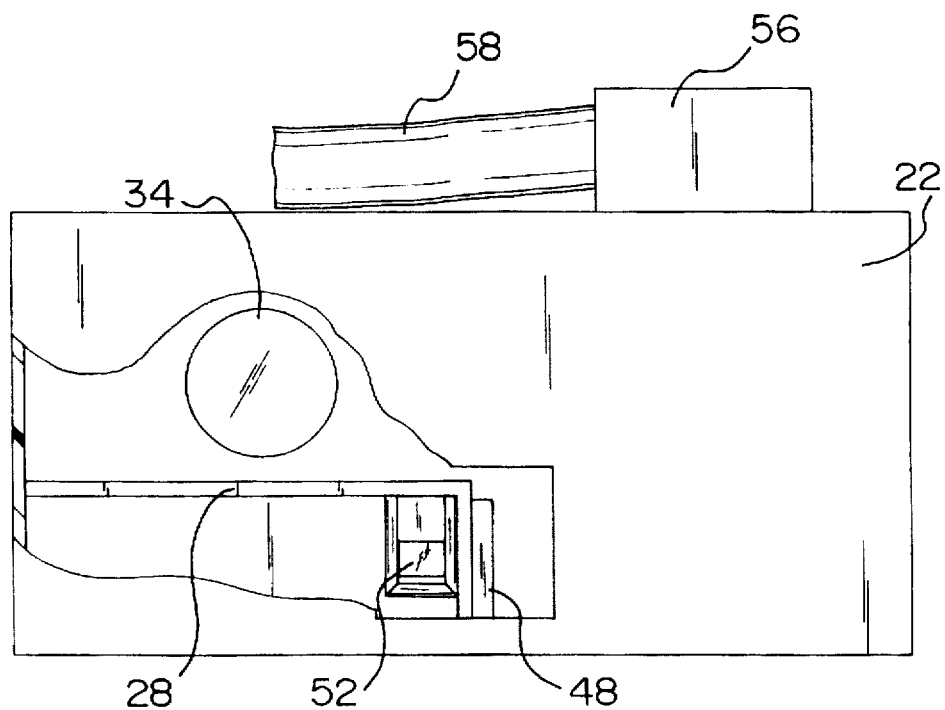
FIG. 4 is a side elevation view of the present invention illustrating the motion detector.

With reference now to the drawings, and in particular, to FIGS. 1 through 6 thereof, the preferred embodiment of the new and improved ventilated cat litter box embodying the principles and concepts of the present invention and generally designated by the reference number 10 will be described.

Specifically, it will be noted in the various Figures that the system relates to a ventilated cat litter box for eliminating unwanted cat litter box odors from within a home. In its broadest context, the system consists of a housing, a pull out drawer, a deodorizer, a motion detector and an exhaust fan. Such components are individually configured and correlated with respect to each other so as to attain the desired objective.

The present invention is a system 10. The system 10 includes a housing 12 having a generally rectangular configuration. The housing 12 has a top wall 14, a bottom wall 16, a front wall 18, a back wall 20 and two opposed side walls 22. An interior surface of the bottom wall 16 has a layer of synthetic carpeting 24 disposed thereon. The synthetic carpeting 24 serves to clean cat litter residue off of the cat's paws. The front wall 18 has an opening 26 therethrough. The housing 12 has an L-shaped shelf 28 secured therein extending between the back wall 20 and one of the two opposed side walls 22. The L-shaped shelf provides a sitting area for the cat if it chooses to remain within the housing 12. The L-shaped shelf 28 has a front portion 30 extending downwardly from a front edge thereof. One of the opposed side walls 22 has an open doorway 32 therethrough. The open doorway 32 provides access to the interior of the housing 12 for the cat. A circular window 34 extends through the opposed side wall 22 opposite the open doorway 32. The circular window 34 is elevated for viewing of the interior of the housing 12 by the cat's owners.

Figure 5:
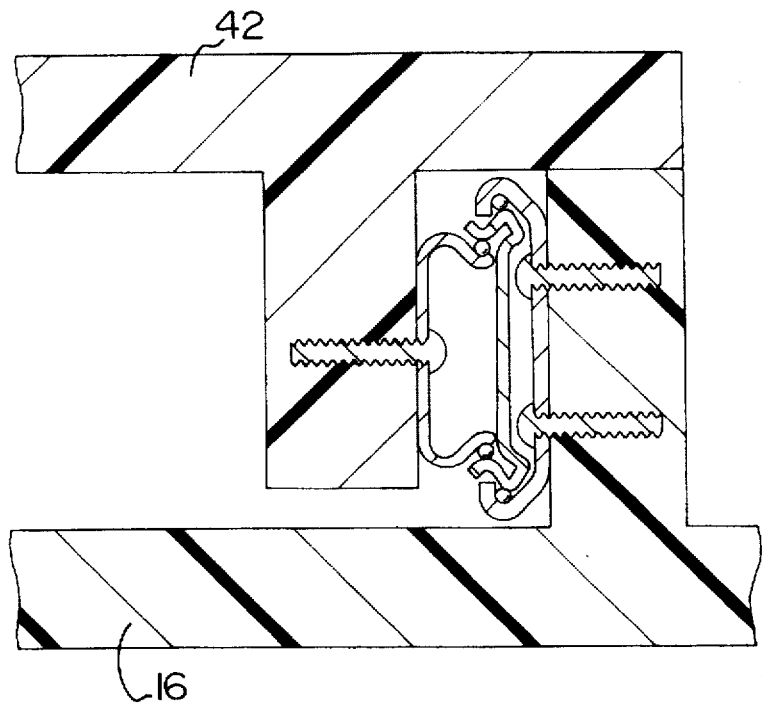
FIG. 5 is a cross-sectional view as taken along line 5—5 of FIG. 5.
Figure 6:
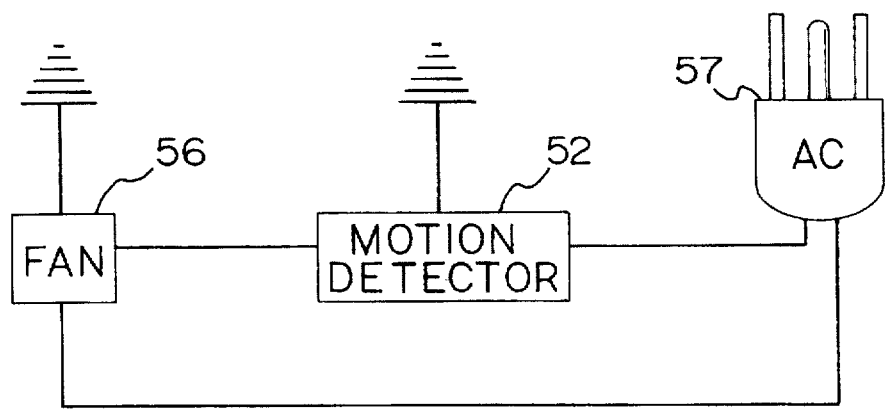
FIG. 6 is a schematic electrical diagram for the operation of the fan and motion detector of the present invention.

A pull out drawer 38 is slidably disposed within the opening 26 in the front wall 18 of the housing 12. The pull out drawer 38 includes a front panel 40 and an interior panel 42. The interior panel 42 extends inwardly of the housing 12 from a lower edge of the front panel 40 in an orthogonal relationship. The front panel 40 has a window 44 therethrough and a handle 46 disposed below the window 44. The interior panel 42 is used to hold a litter box thereon. The pull out drawer 38 simply slides outwardly from the housing 12 to remove the soiled cat litter at an appropriate time. FIG. 5 illustrates a sliding arrangement well known in the art for the sliding relationship between the drawer 38 and the housing 12. The window 44 allows for the cat owner to visualize the litter box without having to open the drawer 38.

A deodorizer 48 is secured to the front portion 30 of the L-shaped shelf 28 within the housing 12. The deodorizer 48 serves to offset the unpleasant odor produced from the litter box.

A motion detector 52 is secured to the opposed side wall 22 of the housing 12 opposite the open doorway 32. The motion detector 52 will detect the entrance of the cat into the housing 12.

An exhaust fan 56 is secured within the top wall 14 of the housing 12. The exhaust fan 56 directs air outwardly of the housing 12. The exhaust fan 56 is in electrical communication with the motion detector 52. The exhaust fan and the motion detector are electrically coupled with a standard AC plug 57 for coupling to an electrical outlet. The exhaust fan 56 has a hose 58 extending outwardly therefrom. The hose 58 is then connected to an outlet of the house to dispel unpleasant odors associated with the litter box out of the house. The exhaust fan 56 will be activated by the motion detector 52 upon the detection of the cat entering into the housing 12. The exhaust fan 56 will operate for a predetermined amount of time after the cat has exited the housing 12. The exhaust fan 56 will remove the odors associated with the litter box from the housing 12 to provide a more pleasant environment within the cat owner's home.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A ventilated cat litter box for eliminating unwanted cat litter box odors from within a home comprising, in combination:

a housing having a generally rectangular configuration, the housing having a top wall, a bottom wall, a front wall, a back wall and two opposed side walls, an interior surface of the bottom wall having a layer of synthetic carpeting disposed thereon, the front wall having an opening therethrough, the housing having an L-shaped shelf secured therein extending between the back wall and one of the two opposed side walls, the L-shaped shelf having a front portion extending downwardly from a front edge thereof, one of the opposed side walls having an open doorway therethrough, a circular window extending through the opposed side wall opposite the open doorway;

a pull out drawer slidably disposed within the opening in the front wall of the housing, the pull out drawer including a front panel and an interior panel, the interior panel extending inwardly of the housing from a lower edge of the front panel in an orthogonal relationship, the front panel having a window therethrough and a handle disposed below the window;

a deodorizer secured to the front portion of the L-shaped shelf within the housing;

a motion detector secured to the opposed side wall of the housing opposite the open doorway; and an exhaust fan secured within the top wall of the housing, the exhaust fan directing air outwardly of the housing, the exhaust fan being in electrical communication with the motion detector, the exhaust fan having a hose extending outwardly therefrom.

2. A ventilated cat litter box comprising:

a housing having an opening through a front wall thereof, the housing having an open doorway, the housing having an L-shaped shelf disposed therein, the L-shaped shelf having a front portion extending downwardly from a front edge thereof for securement of a deodorizer thereto;

a pull out drawer slidably disposed within the opening in the front wall of the housing; and an exhaust fan secured within a top wall of the housing, the exhaust fan directing air outwardly of the housing, the exhaust fan having a hose extending outwardly therefrom.

3. The ventilated cat litter box as set forth in claim 2 and further including a deodorizer secured within the housing.

4. The ventilated cat litter box as set forth in claim 2 and further including a motion detector secured within the housing opposite the open doorway, the motion detector being in electrical communication with the exhaust fan.

5. The ventilated cat litter box as set forth in claim 4 wherein an interior surface of a bottom wall of the housing having a layer of synthetic carpeting disposed thereon.

6. The ventilated cat litter box as set forth in claim 4 wherein the L-shaped shelf is secured between a back wall and one of two opposed side walls of the housing.

7. The ventilated cat litter box as set forth in claim 4 wherein the pull out drawer including a front panel and an interior panel, the interior panel extending inwardly of the housing from a lower edge of the front panel in an orthogonal relationship, the front panel having a window therethrough and a handle disposed below the window.

* * * * *